(12) United States Patent
Tsai et al.

(10) Patent No.: US 10,981,169 B2
(45) Date of Patent: Apr. 20, 2021

(54) MICRO-VIALS

(71) Applicant: BIOPTIC, INC., New Taipei (TW)

(72) Inventors: Shou-Kuan Tsai, New Taipei (TW); Varouj D. Amirkhanian, La Crescenta, CA (US)

(73) Assignee: BIOPTIC, INC., New Taipei (TW)

( * ) Notice: Subject to any disclaimer, the term of this patent is extended or adjusted under 35 U.S.C. 154(b) by 121 days.

(21) Appl. No.: 16/261,481

(22) Filed: Jan. 29, 2019

(65) Prior Publication Data

US 2019/0224669 A1 Jul. 25, 2019

Related U.S. Application Data

(63) Continuation of application No. 14/314,025, filed on Jun. 24, 2014, now abandoned, which is a continuation of application No. 29/458,922, filed on Jun. 24, 2013, now Pat. No. Des. 717,468.

(60) Provisional application No. 61/838,791, filed on Jun. 24, 2013.

(51) Int. Cl.
*B01L 3/00* (2006.01)
*G01N 30/18* (2006.01)

(52) U.S. Cl.
CPC ......... *B01L 3/5082* (2013.01); *B01L 3/50855* (2013.01); *B01L 3/502715* (2013.01); *B01L 2200/025* (2013.01); *B01L 2200/027* (2013.01); *B01L 2200/0673* (2013.01); *B01L 2200/142* (2013.01); *B01L 2300/0832* (2013.01); *B01L 2300/0838* (2013.01); *B01L 2300/0851* (2013.01); *G01N 30/18* (2013.01)

(58) Field of Classification Search
CPC ........ B01L 3/50; B01L 3/5027; B01L 3/5082; B01L 3/50855; B01L 2300/0851; B01L 2300/0838; B01L 3/502715; B01L 3200/0848
USPC ..... 220/23.4, 23.2, 23.8; 442/547, 549, 548; 206/438
See application file for complete search history.

(56) References Cited

U.S. PATENT DOCUMENTS

| | | |
|---|---|---|
| 4,039,435 A | 8/1977 | Narva |
| 4,160,803 A | 7/1979 | Potts |
| 4,214,993 A | 7/1980 | Forsythe et al. |
| 4,243,534 A | 1/1981 | Bulbenko |
| 4,341,635 A | 7/1982 | Golias |
| D282,208 S | 1/1986 | Lowry |
| 4,787,971 A | 11/1988 | Donald |
| D373,633 S | 9/1996 | La Motte |

(Continued)

*Primary Examiner* — Steven A. Reynolds
(74) *Attorney, Agent, or Firm* — Liu & Liu (57) ABSTRACT

A micro-vial for handling micro-volume of sample fluids. The interior wall defined in the vial has a cylindrical sample section, a wider cylindrical alignment section, a tapered or conical guide section, and a relatively large cylindrical body section, arranged in sequence in that order along the center axis of the vial. The sample section holds a small volume of a sample fluid and receives the tip end of a capillary tube. The alignment section has a larger diameter than the sample section, receiving a cylindrical support that coaxially supports the relatively fragile capillary tube. The tip of the capillary tube dips into the micro-volume of sample fluid held in the sample section. The conical section guides the capillary tube and the support tube into the alignment section and the tip of the capillary tube into the sample section.

19 Claims, 13 Drawing Sheets

(56) References Cited

U.S. PATENT DOCUMENTS

| | | | |
|---|---|---|---|
| 5,650,068 A | | 7/1997 | Chachowski et al. |
| 5,683,659 A | | 11/1997 | Hovatter |
| 6,027,694 A | * | 2/2000 | Boulton ............... B01J 19/0046 422/553 |
| 6,117,394 A | | 9/2000 | Smith |
| 6,177,009 B1 | | 1/2001 | Sieber et al. |
| 6,221,655 B1 | | 4/2001 | Fung et al. |
| D445,907 S | | 7/2001 | Monks |
| 6,254,834 B1 | | 7/2001 | Anderson et al. |
| 6,258,047 B1 | * | 7/2001 | Muramatsu ............ A61B 5/103 600/594 |
| 6,402,950 B1 | | 6/2002 | Nix et al. |
| 6,761,855 B1 | * | 7/2004 | Cook ................. G01N 30/6052 210/198.2 |
| D608,013 S | | 1/2010 | Coulling et al. |
| 8,247,545 B1 | | 8/2012 | Colpan |
| D679,830 S | | 4/2013 | May et al. |
| D687,567 S | | 8/2013 | Jungheim et al. |
| D709,625 S | | 7/2014 | Baum et al. |
| D759,835 S | | 6/2016 | Baum et al. |
| 2001/0047966 A1 | | 12/2001 | Colpan |
| 2002/0170911 A1 | * | 11/2002 | Lafond ............... B01L 3/50853 220/23.4 |
| 2005/0181519 A1 | * | 8/2005 | Karg .................... B01L 3/0293 436/180 |
| 2007/0140919 A1 | | 6/2007 | Clarkson et al. |
| 2013/0029343 A1 | | 1/2013 | Day et al. |

\* cited by examiner

MICRO-VIALS

This application is a continuation of U.S. Utility patent application Ser. No. 14/314,025 filed on Jun. 24, 2014, which (a) claims the priority of U.S. Provisional Patent Application No. 61/838,791 filed on Jun. 24, 2013 and (b) is also a continuation of U.S. patent application Ser. No. 29/458,922 filed on Jun. 24, 2013, now U.S. Design Pat. No. D717,468, which are fully incorporated by reference as if fully set forth herein. All publications noted below are fully incorporated by reference as if fully set forth herein.

BACKGROUND OF THE INVENTION

1. Priority Claim

2. Field of the Invention

The present invention is directed to receptacles for holding fluid for bio-analysis, and more particularly to vials for holding small volumes of fluids.

3. Description of Related Art

DNA sequencing is a type of bio-analysis, involving the process of determining the precise order of nucleotides within a DNA molecule. It includes any method or technology that is used to determine the order of the four bases—adenine, guanine, cytosine, and thymine—in a strand of DNA. The advent of rapid DNA sequencing methods has greatly accelerated biological and medical research and discovery.

Knowledge of DNA sequences has become indispensable for basic biological research, and in numerous applied fields such as diagnostic, biotechnology, forensic biology, and biological systematics. The rapid speed of sequencing attained with modern DNA sequencing technology has been instrumental in the sequencing of complete DNA sequences, or genomes of numerous types and species of life, including the human genome and other complete DNA sequences of many animal, plant, and microbial species.

Next-generation sequencing (NGS) has revolutionized the genetic landscape. It is a lengthy, labor-intensive process that yields results never before achieved. As a result, it is imperative that the quality of the DNA sample be evaluated from the start, as most NGS sample preparation protocols require PCR amplification to generate DNA libraries prior to sequencing.

The likelihood of artifact generation could contribute to bias, affecting the potential results. High sensitivity DNA analysis has been optimized with the improved capillary gel electrophoresis detection systems developed by the assignee of the present invention, BiOptic, Inc. (see, U.S. Patent Application Publication Nos. US2011/0253540A1 and 2012/0168312A1; and, for example, the Qsep100 instrument developed by BiOptic, Inc.). Improved sensitivity allows the numbers of library PCR cycles to be reduced, removing amplification bias and significantly improving the quality of NGS data with increased accuracy.

Since relatively large volumes (e.g., in the order of 20 to 40 micro-liters) of PCR products are necessary/needed to be used in sequencing type instruments, and the sequencing sample preparation process is costly, preferably a small volume of PCR product is sampled for screening quickly (e.g., through gel-electrophoresis or capillary electrophoresis) to make sure there is enough PCR product present (detected) in the PCR products before proceeding with the full sequencing process (DNA analysis). This involves injecting a small volume of sample PCR product into the tip of a capillary tube, to allow the sample to undergo electrophoresis through the capillary tube. It is desired to sample as small a volume of PCR product as possible, so as to leave more PCR products available for subsequent sequencing.

It has always been a challenge in the field to try to contain a small volume of fluid in micro volume in the order of several micro-liters in a receptacle, and in particular in a manner to provide access to sample by a capillary tube.

SUMMARY OF THE INVENTION

The present invention provides a simple, low cost, efficient and stable micro-vial configuration for handling micro-volume of sample fluids, which overcomes the drawbacks of the prior art. Accordingly to the present invention, the internal wall geometry of the inventive vial is designed to include several axial sections of various interior diameters to provide a range of functionalities to address various design considerations. The interior wall defined in the vial has a cylindrical sample section, a wider cylindrical alignment section, a tapered or conical guide section, and a relatively large cylindrical body section, arranged in sequence in that order along the center axis of the vial.

The sample section has the smallest diameter of all the sections, designed to hold a small volume of a sample fluid (e.g., in the order of less than 5 micro-liters, preferably 1 to 2 micro liters), and to receive the tip end of a capillary tube. The alignment section has a larger diameter than the sample section, designed to receive a cylindrical support that coaxially supports the relatively fragile capillary tube. The support may be a metal tube, which extends from a capillary cartridge and functions as a tube-shaped electrode for such cartridge. The capillary tube is threaded through the bore of the support tube, and the tip of the capillary tube extends beyond and is exposed from the end of the support tube. The tip of the capillary tube dips into the micro-volume of sample fluid held in the sample section. The conical section functions to guide the capillary tube and the support tube into the alignment section and the tip of the capillary tube into the sample section. The body section has the largest diameter. The vial thus has the capacity to hold a relatively large volume of fluid, which can fill the body section.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The inventive micro-vial is described in connection with the embodiment of sample injection and detection technique in bio-analysis, particularly micro-volume sample injection, separation and detection through a micro-capillary channel, and more particularly a capillary tube supported in a gel capillary cartridge (e.g., developed by BiOptic, Inc.). The inventive micro-vial is especially useful for pre-screening of PCR DNA products prior to Next Generation Sequencing applications. The inventive micro-vial can be adapted for use with other bio-analysis tools, instruments and systems, in connection with other bio-analysis processes, which is well within the scope and spirit of the present invention.

The present invention provides a simple, low cost, efficient and stable micro-vial configuration for handling micro-volume of sample fluids, e.g., for injection into a capillary column for bio-separation (e.g., capillary electrophoresis for detection of PCR products (i.e., DNA sample)).

Figure 15:
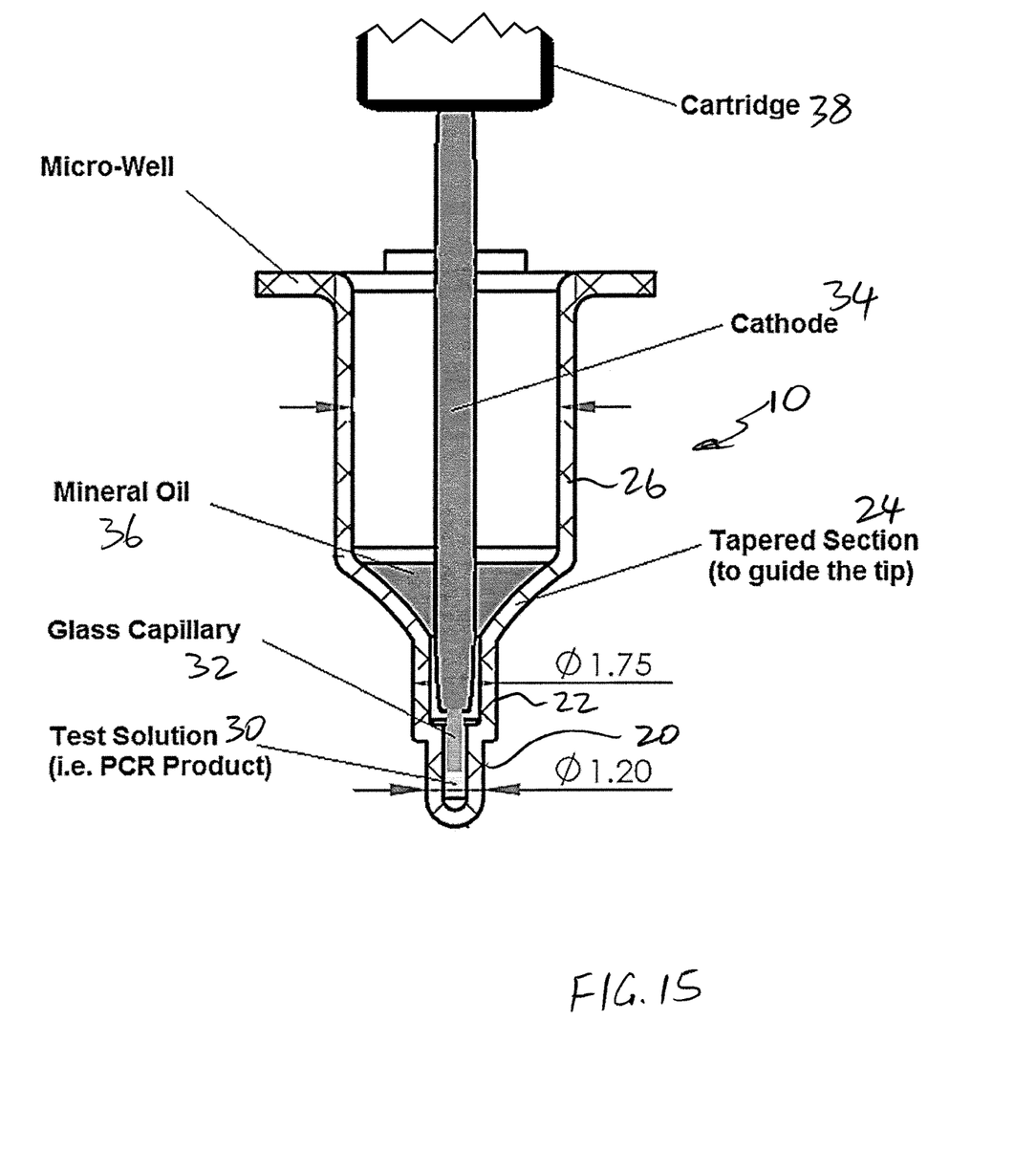
FIG. 15 is a pictorial view showing access of sample solution in a single micro-vial.
Figure 16:
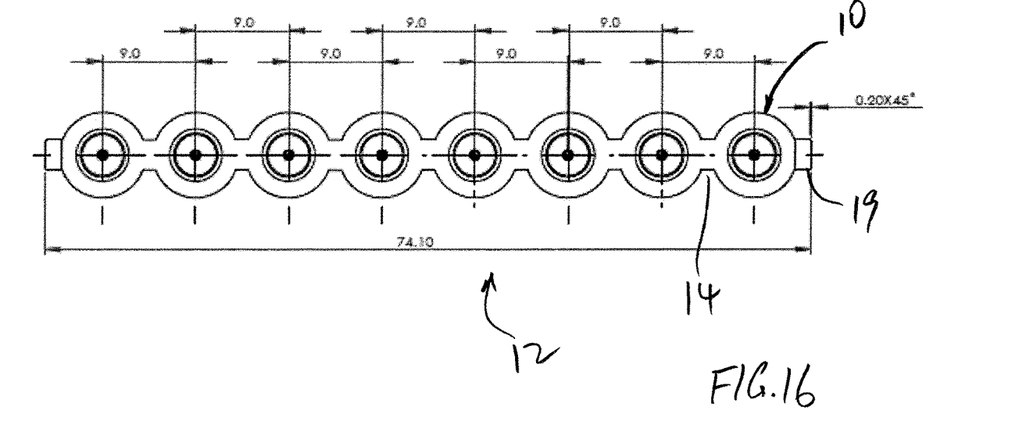
FIG. 16 is a top view of a strip of micro-vials, providing dimensions in accordance with one embodiment of the present invention.
Figure 17:
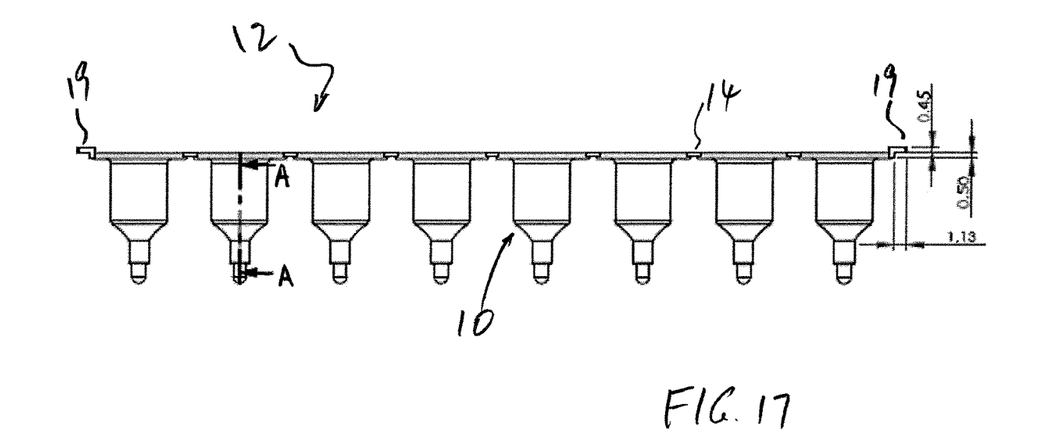
FIG. 17 is a side view of the strip of FIG. 16, providing additional dimensions, in accordance with one embodiment of the present invention.
Figure 18:
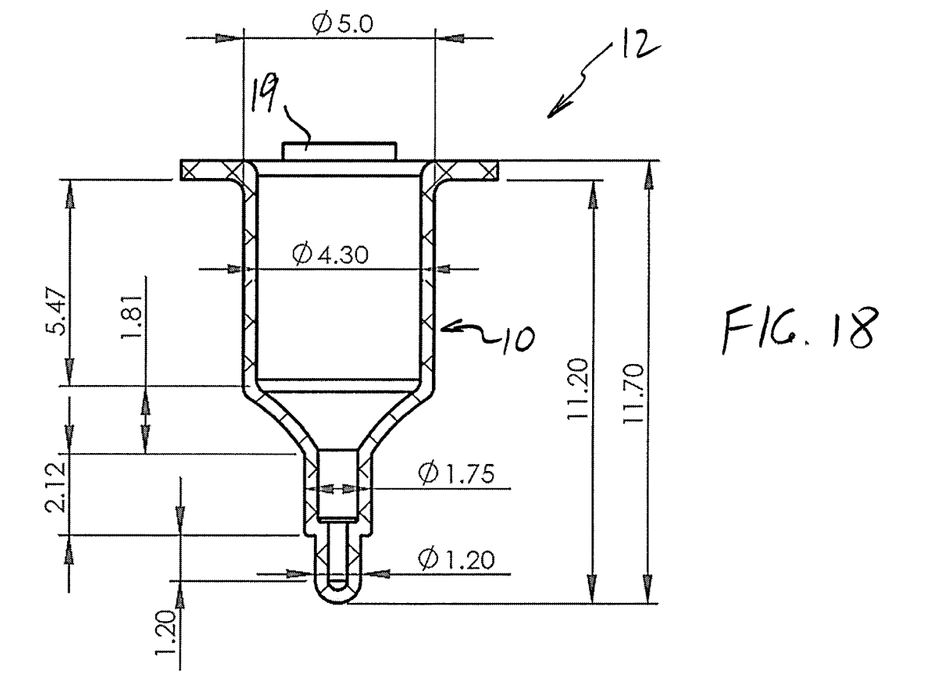
FIG. 18 is a sectional view taken along line A-A in FIG. 17, providing additional dimensions, in accordance with one embodiment of the present invention.
Figure 19:
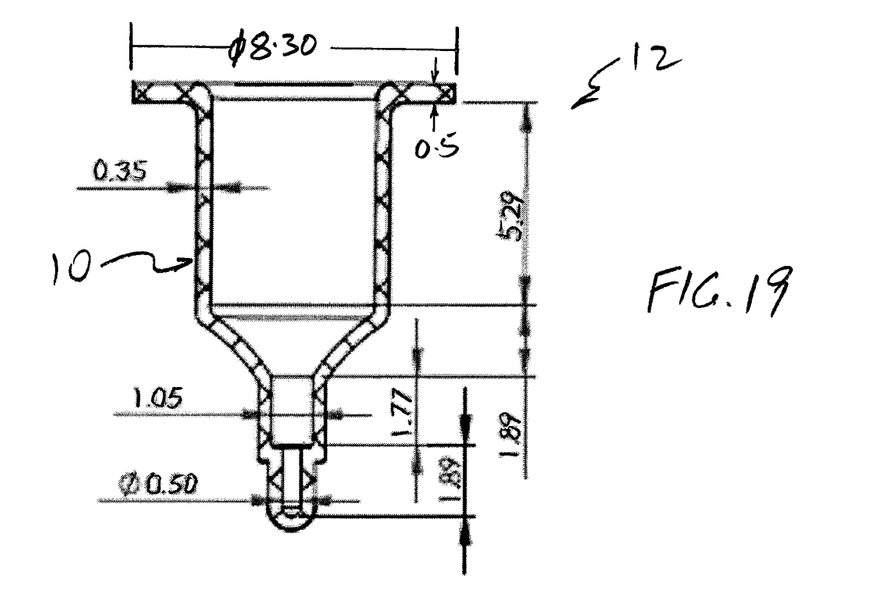
FIG. 19 is another sectional view taken along line A-A in FIG. 17, providing additional dimensions, in accordance with one embodiment of the present invention.

Referring to the embodiment shown in FIGS. 1-6, the micro volume vials 10 can be configured in a strip 12 of N vials (wherein N is at least 1, but can be 8, 12, or any desired number). Referring to FIGS. 7-12, an alternate embodiment is shown with broken lines to depict a strip 12' having at least two vials 10, but the number of vials may be indefinite, or of any number. Further, instead of a strip of a plurality of vials 10, it is well within the present invention to configure separate single vials 10 (see, e.g., FIG. 15, depicting a single vial 10). Further, instead of strips, the vials 10 may be defined as wells in a block or plate (i.e., a 96-well micro-titer plate having wells defined with the interior wall geometry of the vial 10 disclosed here).

Specifically, adjacent vials are connected at the opening area by a tap 14. A handle 19 is provided at each end of the strip 12. In one embodiment, the center spacing between vials may be configured to correspond to the format of an industry standard 96-well (8×12) micro-titer plate. Several strips 12 of vials may be assembled to form a tray of wells, e.g., resembling a 96-well titer plate, by using an appropriate holder or bracket (not shown).

Figure 1:
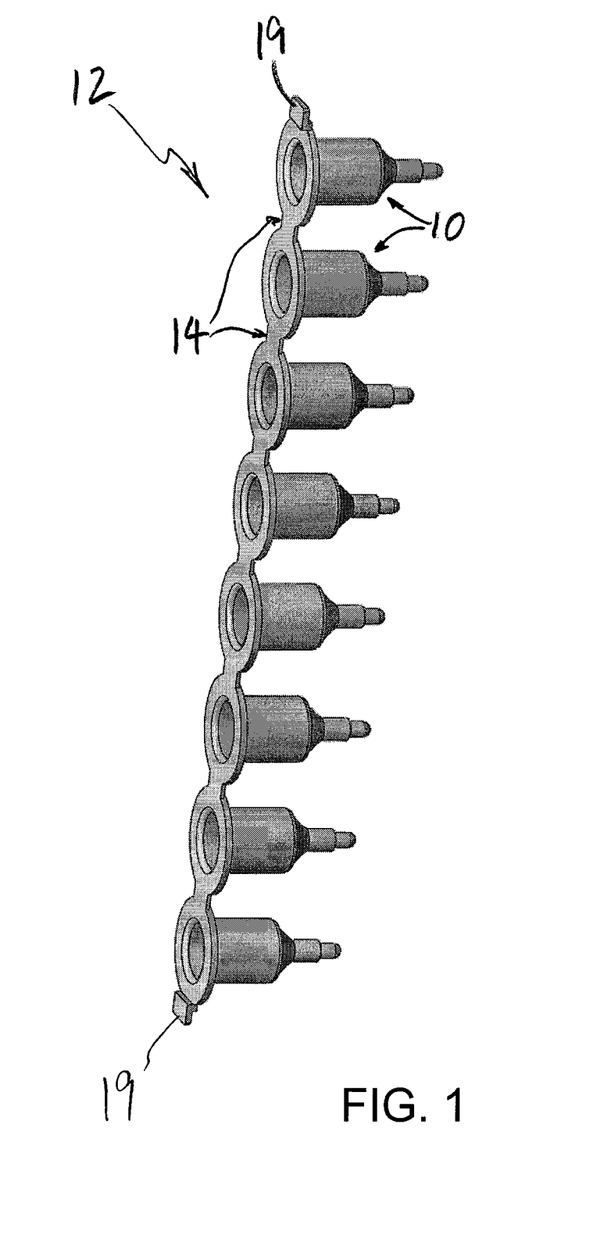
FIG. 1 is a perspective view of a strip of micro-vials in accordance with one embodiment of the present invention.
Figure 2:
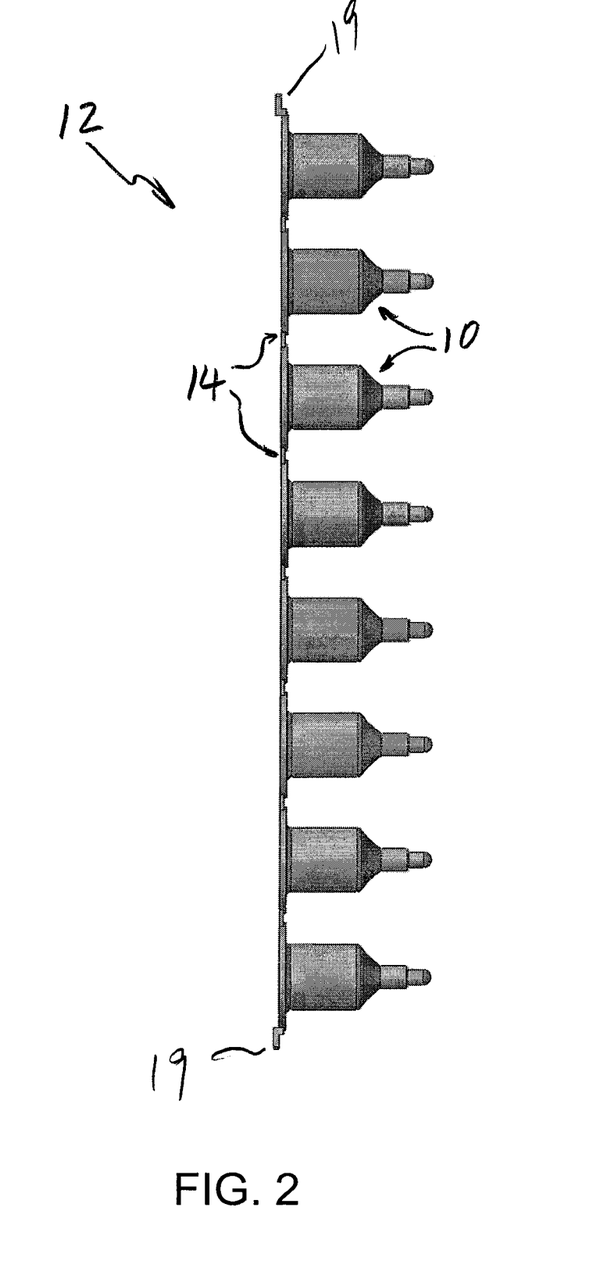
FIG. 2 is a front view thereof (the rear view is a mirror image of the front view)
Figure 3:
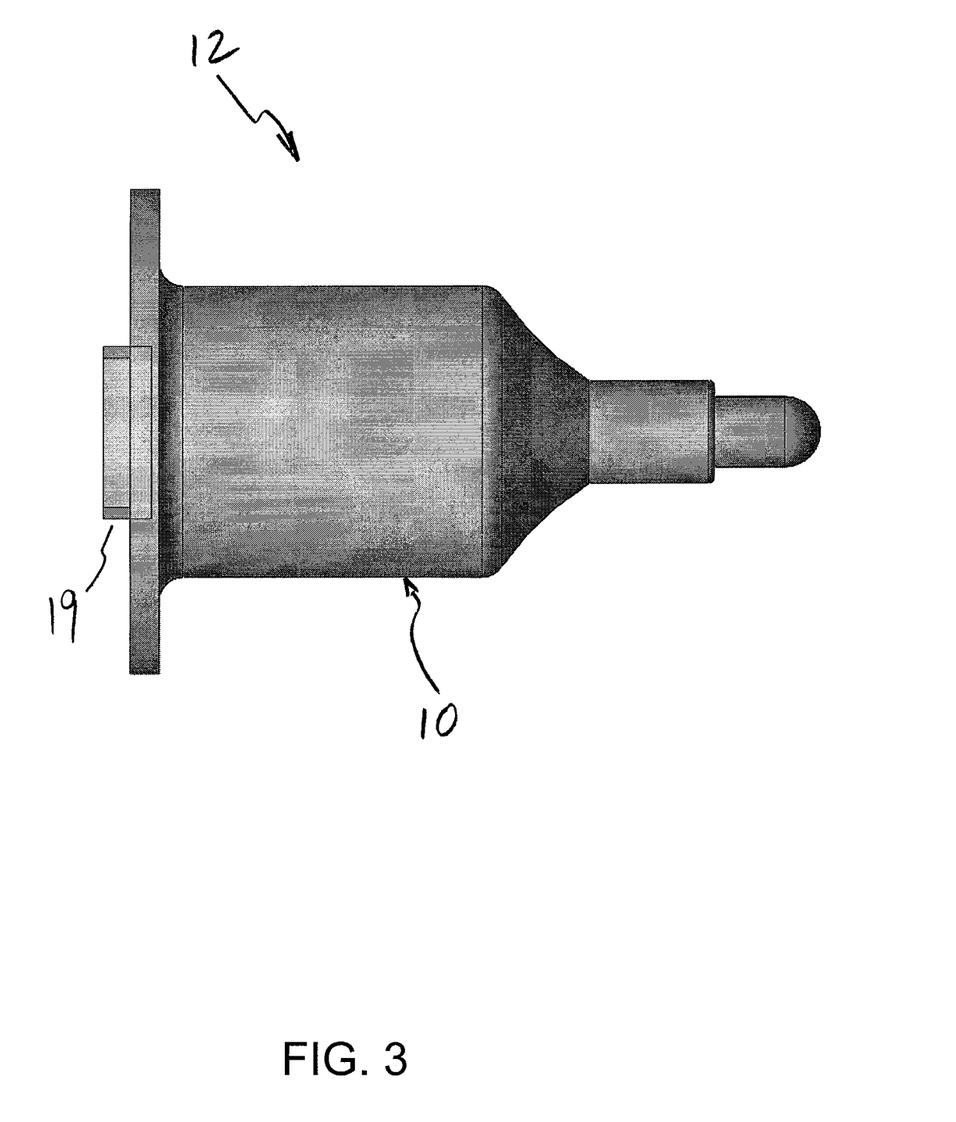
FIG. 3 is a right side view thereof (the left side view is a mirror image of the right side view)
Figure 4:
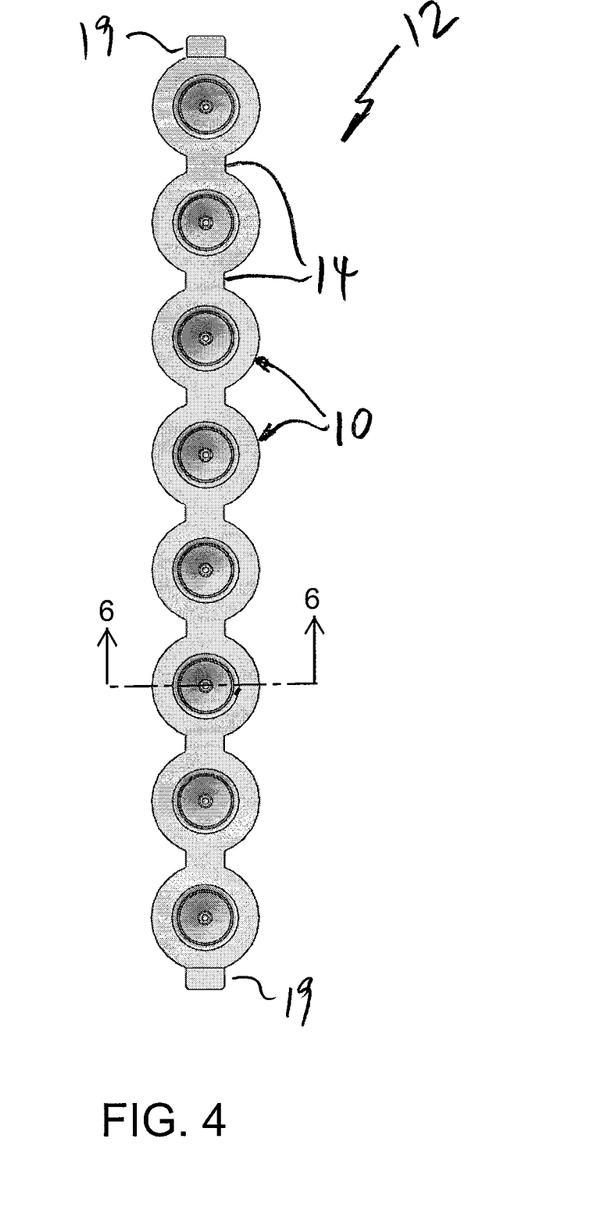
FIG. 4 is a top plan view thereof.
Figure 5:
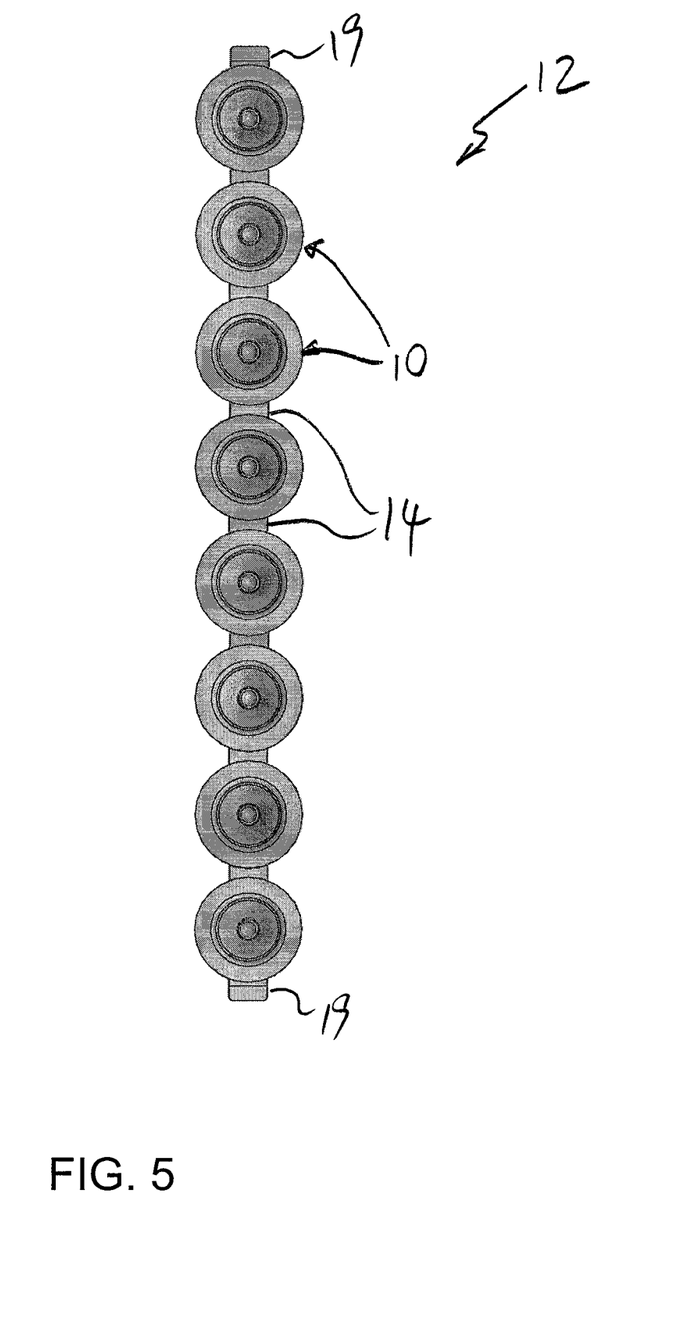
FIG. 5 is a bottom plan view thereof.
Figure 6:
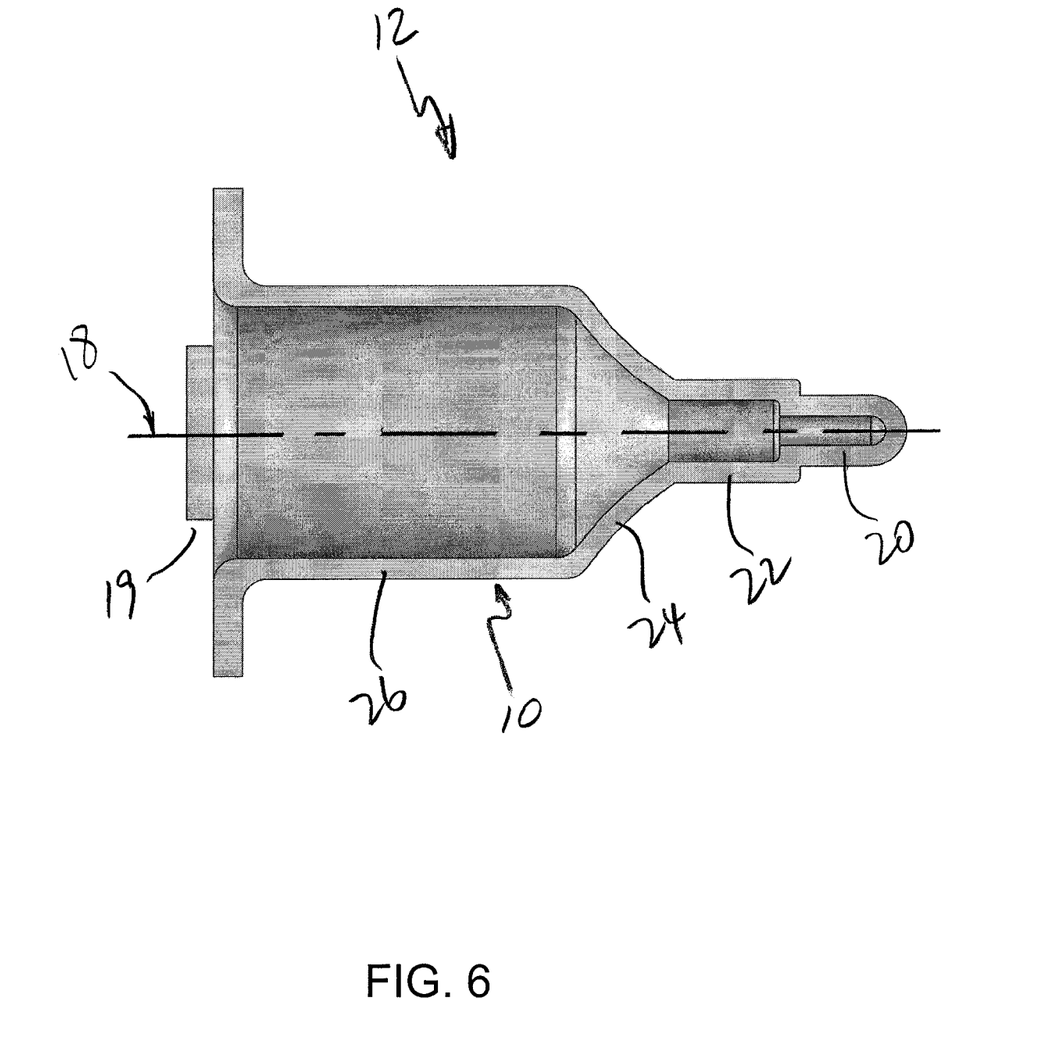
FIG. 6 is a sectional view of a micro-vial taken along line 6-6 in FIG. 4, showing interior structure, wherein each micro-vial has a similar interior structure.
Figure 7:
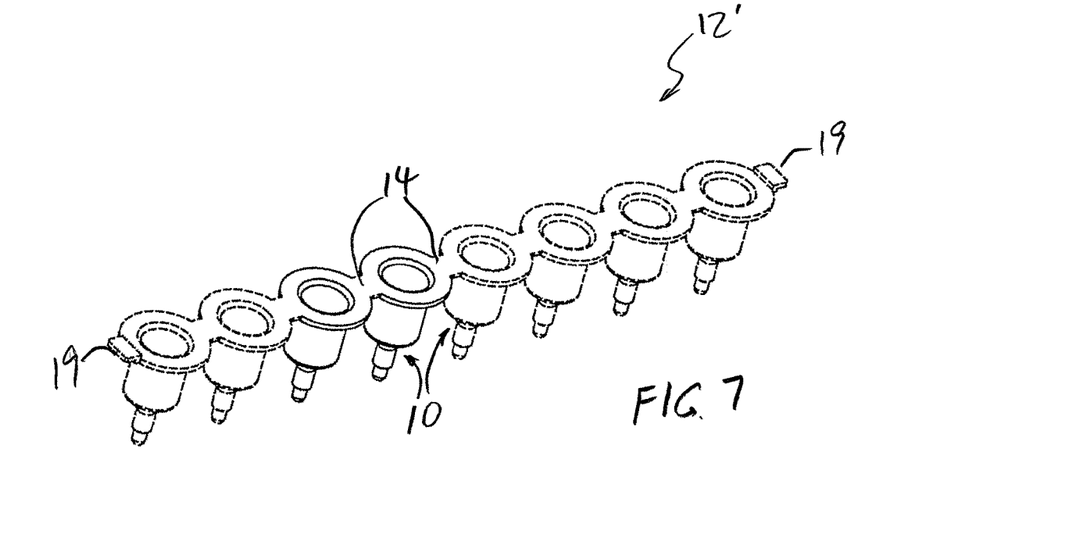
FIG. 7 is a perspective view of a strip of micro-vials with broken lines depicting a strip of micro-vials of indefinite number of vials, in accordance with one embodiment of the present invention (i.e., the inventive concept is not limited to the specific number of micro-vials link together).
Figure 8:
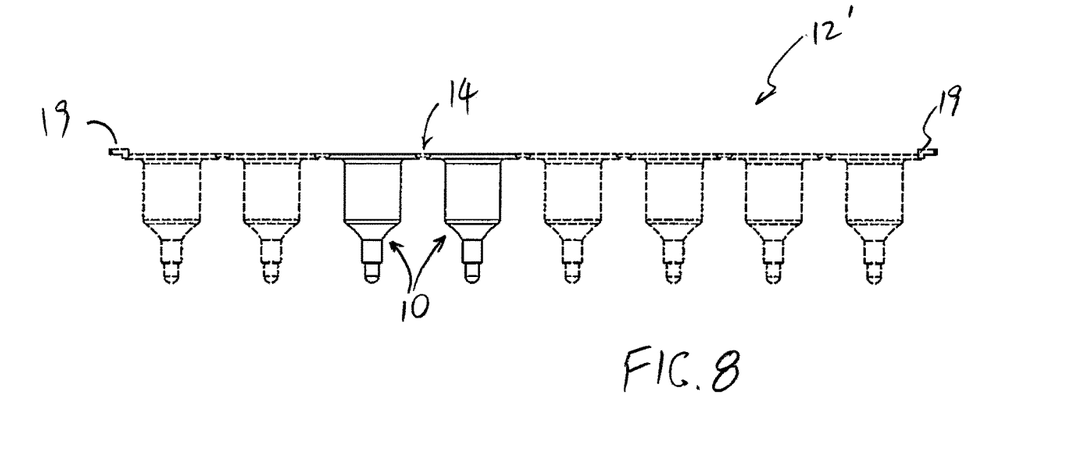
FIG. 8 is a front view thereof (the rear view is a mirror image of the front view)
Figure 9:
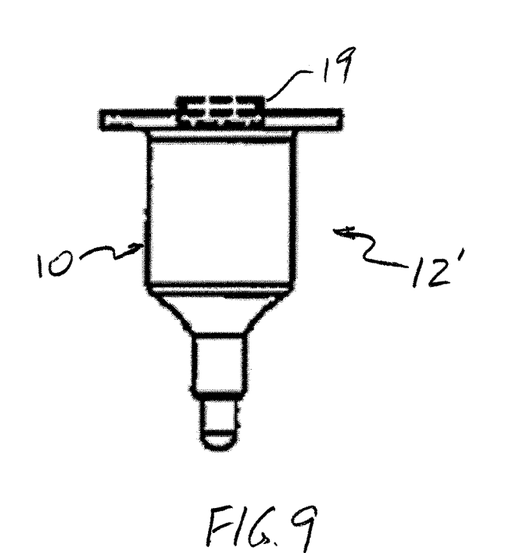
FIG. 9 is a right side view thereof (the left side view is a mirror image of the right side view)
Figure 10:
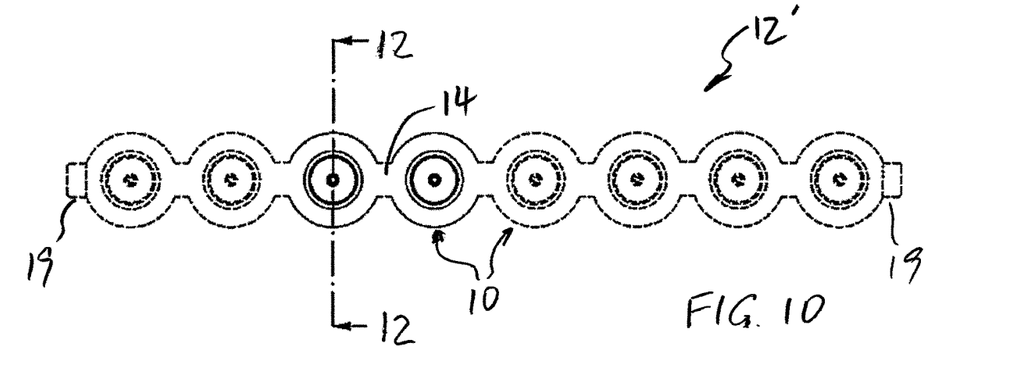
FIG. 10 is a top plan view thereof.
Figure 11:
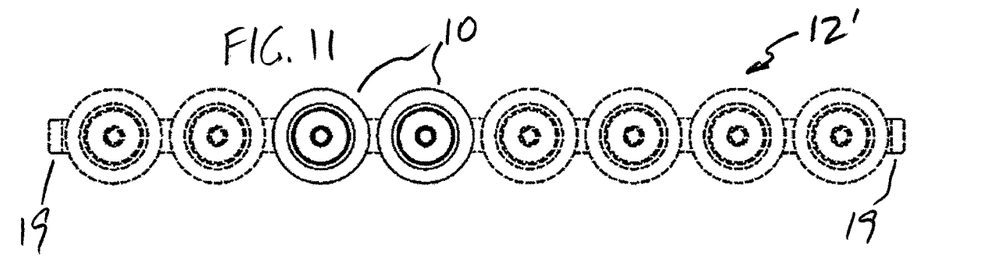
FIG. 11 is a bottom plan view thereof.
Figure 12:
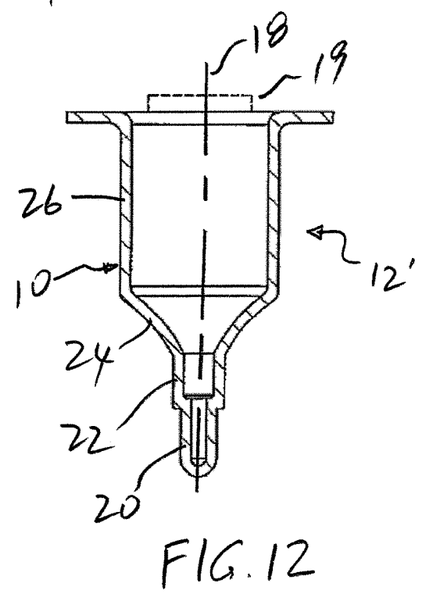
FIG. 12 is a sectional view of a micro-vial taken along line 12-12 in FIG. 10, showing interior structure, wherein each micro-vial has a similar interior structure.

Referring to the sectional views in FIGS. 6 and 12, the vial 10 has an external geometry which is not critical to the function of micro-volume fluid handling. In this regards, the vial 10 may be configured with a relatively large external body (e.g., a block having interior walls defining the interior wall geometry of the vial) for easier handling by a user. Accordingly to the present invention, the internal wall geometry of each vial 10 is designed to include several axial sections of various interior diameters to provide a range of functionalities to address various design considerations. Referring also to the pictorial FIG. 15, the interior wall defined in the vial 10 has a cylindrical sample section 20, a cylindrical alignment section 22, a tapered or conical section 24, and a cylindrical body section 26, arranged in sequence in that order along the center axis 18 of the vial. As shown in this embodiment, the wider cylindrical alignment section 22 is immediate adjoining to the cylindrical sample section 20 along the center axis of the body, wherein an exit end of the wider cylindrical alignment section 22 immediate adjoins an opening end of the cylindrical sample section 20.

The section 20 has a cylindrical section with a bottom, and has the smallest diameter of all the sections, designed to hold a small volume of a sample fluid 30 (e.g., in the order of less than 5 micro-liters, preferably 1 to 2 micro liters), and to receive the tip end of a capillary tube 32 (e.g., about 0.350-400 mm overall external diameter, including cladding or protective coating on the silica capillary tube 32).

The alignment section 22 has a larger diameter than section 20, designed to receive a cylindrical support 34 that coaxially supports the relatively fragile capillary tube 32. The support may be a metal tube (e.g., about 1 mm outside diameter, with a bore having an inner diameter of about 0.5 mm internal diameter to receive the capillary tube 32), which extends from a capillary cartridge 38 and functions as a tube-shaped cathode 34 for such cartridge 28, as shown in FIG. 15 (see BiOptic's capillary cartridge and analysis system discussed in U.S. Patent Application Publication Nos. US2011/0253540A1 and 2012/0168312A1). The capillary tube 32 is threaded through the support tube 34, and the tip of the capillary tube 32 extends beyond and is exposed from the end of the support tube 34. As shown in FIG. 15, the tip of the capillary tube 32 dips into the sample fluid in section 20.

The conical section 24 provides a tapered wall surface to guide the capillary tube 32 and the support tube 34 into the alignment section 22 and the tip of the capillary tube 32 into the section 20.

The body section 26 has an opening, and the largest diameter of the wall sections. The vial 10 thus has the capacity to hold a relatively large volume of fluid, which can fill the body section 26.

A mineral oil 36 may be provided to fill the space above the sample fluid in the section 20, to prevent evaporation of the small volume of sample fluid. The mineral oil 36 may fill the alignment section 22 and/or the conical section 24 and/or the body section 26.

Referring to FIGS. 16-19, exemplary dimensions of a strip 12 of vials 10 are provided, in accordance with one embodiment of the present invention. All dimensions shown in FIGS. 16-19 are in mm unit, unless otherwise stated.

The above described micro-vials 10 and strips 12 may be made of materials including glass, metal, plastic, rubber, silicon, etc., preferably of a chemically inert material that is inert to reacting with the fluid intended to be held in the vials 10. The vials 10 and/or strips 12 may be formed by etching (e.g., of a semiconductor material such as a silicon substrate), stamping (e.g., of a metal or plastic), or molding (e.g., plastic or rubber injection molding). Further, the vials 10 and strip 12 may be made of different materials, which may be fused together to form the strip 12. The wall structure of the vials may be made of a certain material and the interior wall of the vials 10 may be lined with a chemically inert material.

Using the inventive vial for handling a micro volume of sample fluid, it is possible to develop bio-analysis systems that are significantly small in overall size (see, e.g., BiOptic's Qsep 100 instrument). Miniaturization of analytical instrumentation has many advantages over conventional systems and techniques. These advantages include improved data precision and reproducibility, short analysis times, minimal sample consumption, improved automation and integration of complex workflows.

In one embodiment, an injection-molded vial 10 can accommodate a small volume of 1 to 2 micro-liters (e.g., of PCR DNA Sample to be injected electro-kinetically using Capillary Gel Electrophoresis (CGE) for pre-screening and quality control (qualitative and quantitative). The micro-vials are injection molded in strips of 8-vials or 12-vials and can be directly inserted inside the BiOptic's CGE system (Qsep100) Sample Tray to interface the Pen-Shaped Gel-Cartridge for sample intake through the automated sample tray. Reference is made to BiOptic's capillary cartridge and analysis system discussed in U.S. Patent Application Publication Nos. US2011/0253540A1 and 2012/0168312A1).

According to the micro-vial design geometry of the present invention, it facilitates sample injection in micro-liter volume of 1 to 2 micro-liters. The alignment section 22 of the vial 10 allows the gel-cartridge electrode (cathode tube 34 in FIG. 15) with supported capillary tube 32 to be inserted and aligned accurately for sample intake at the sample holding section 20.

Figure 13:
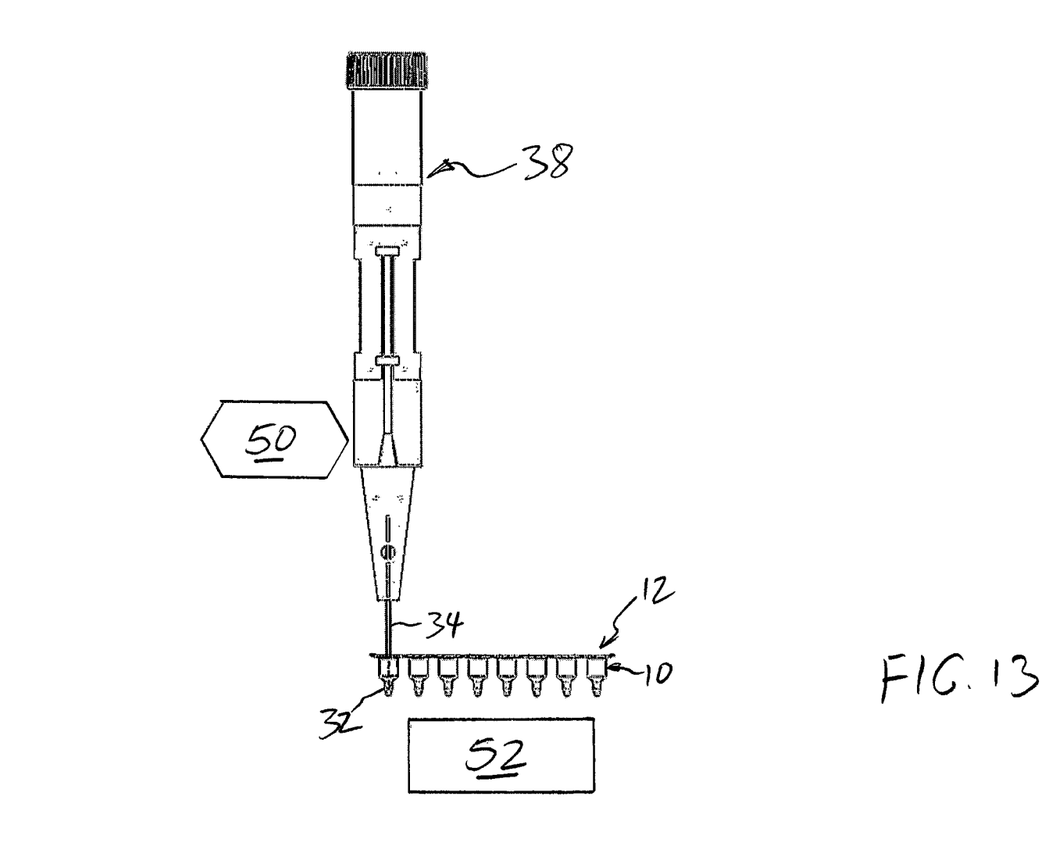
FIG. 13 schematically illustrates access of the micro-vials by an external device.
Figure 14:
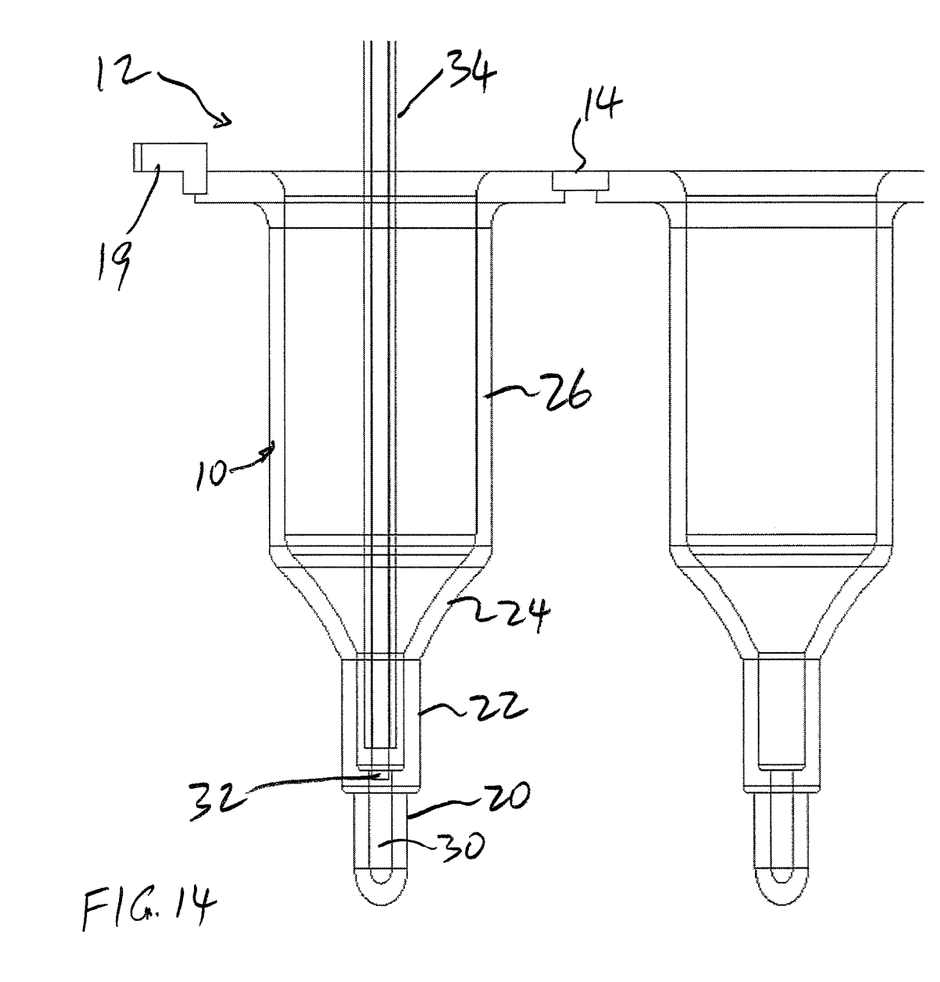
FIG. 14 is an enlarged view of the access of sample solution in a micro-vial.

The access of sample held in the vial 10 by a cartridge 38 is schematically shown in FIGS. 13, 14 and 15. Referring to BiOptic's Qsep100 DNA analyzer, the cartridge 38 is supported on a stand 50 (schematically shown in FIG. 13), and a robotic mechanism 52 (schematically shown in FIG. 13) moves the sample tray supporting the vials 10 relative to the tip of the capillary tube 32 supported in the cartridge 38. The cathode tube 34 (which coaxially supports the capillary tube 32) in the cartridge 38 may be aligned automatically by the sample tray mechanism, with the conical tapered section 24 of the vial 10 guiding entry of cathode tube 34 inside the alignment section 22, which has an internal diameter (e.g., 1.75 mm) that is close to the outside diameter of the cathode tube 34 (1 mm). Referring to FIGS. 14 and 15, as the cathode tube 34 is further inserted inside the vial 10, the tip of the capillary tube 32 is guided and aligned to ensure contact with the test or sample solution 30 (e.g., DNA sample).

One micro-liter of test solution can be placed in the sample section 20 inside the vial 10 by using, for example, a standard handheld pipette. Since small air-bubbles could be introduced during sample deposition by the pipette, it is recommended to spin (centrifuge) the vial 10 (e.g., the entire strips 12 before further processing (in much the same way a standard 96-well microtiter plate is centrifuged). It is also recommended to apply a small amount of mineral oil to prevent sample evaporation and facilitate multiple consecutive sample injections.

The vials 10 are designed to be single unit, or in 8 and/or 12-strips, or could be molded to be 96-vial or 384-vial format. The vials 10 can be used with other capillary electrophoresis, HPLC or micro-fluidic type products (from different manufacturers) that have capillary based cartridge, in which the capillary is supported by a metal, plastic, ceramic or other outside jacket/electrode.

In Summary, the inventive micro-vial achieve one or more of the following advantages:

The inventive micro-vial allows handling of 1 to 2 micro-liter volume of sample (e.g., PCR DNA sample) to be allocated inside the vial to be interfaced with a capillary based cartridge for automated sample injection.

By applying a drop of mineral oil over the 1 to 2 micro-liters of sample inside the micro-vial, one can do multiple sample injections (electro-kinetically) into the pen-shaped gel-cartridge. The mineral oil prevents sample evaporation, and due to conductive properties, it also facilitates multiple injections.

The inventive strips of vials (e.g., injection molded strips) may be either in a strips of 8 or 12 vials, conforming to industry standard formats, which allows the strips to be expanded to 96-vial and/or 384-vial formats, if desired.

The inventive micro-vial design allows small consumption of DNA products (gDNA) to be sample for quality control prior to qPCR or Sanger Sequencing analysis, or for post-PCR sample analysis using capillary electrophoresis-based DNA fragment analyzers.

The inventive micro-vial design provides flexibility for automated sample injection in CGE based instruments.

The inventive micro-vial design provides robust and reproducible sample injections, resulting in accurate analysis results with better integrity.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A vial for holding a micro-volume of fluid, comprising: a body defining an interior wall, wherein the body is a unitary structure, comprising a cylindrical sample section having a closed bottom, a wider cylindrical alignment section, a conical guide section, and a relatively large cylindrical body section having an opening, arranged in sequence in that order along a center axis of the body, wherein the wider cylindrical alignment section is immediate adjoining to the cylindrical sample section along the center axis of the body, wherein the cylindrical sample section is sized to receive a tip of a capillary tube and to hold a micro-volume of fluid in the order of less than 5 micro-liters, and wherein an exit end of the wider cylindrical alignment section immediate adjoins an opening end of the cylindrical sample section without any restraint at the opening end of the cylindrical sample section to allow insertion of the tip of the capillary tube.

2. The vial as in claim 1, wherein the interior wall of the body transitions from the cylindrical sample section to the wider cylindrical alignment section, wherein interior diameter of the cylindrical sample section transitions to an immediate larger interior diameter of the cylindrical alignment section without a constriction in diameter.

3. The vial as in claim 2, wherein the micro-volume is in the order of 1 to 2 micro liters.

4. The vial as in claim 3, wherein the cylindrical sample section has an internal diameter of about 0.5 mm, receiving the tip of the capillary tube having an outside diameter of similar size.

5. The vial as in claim 4, wherein the cylindrical alignment section has a larger diameter than the cylindrical sample section, sized to receive a cylindrical support for the capillary tube to extend to the cylindrical sample section.

6. The vial as in claim 5, wherein the conical guide section provides a tapered wall surface to guide the capillary tube and the support tube into the cylindrical alignment section and the tip of the capillary tube into the cylindrical sample section.

7. A strip of vials each having a structure as in claim 1 for holding micro-volumes of fluid, comprising a plurality of N (N>0) vials in which adjacent vials are connected by a tab.

8. The strip of vials as in claim 7, wherein N is equal to 8 or 12.

9. The strip of vials as in claim 7, wherein the body of each vial and connecting tab are injection molded plastic.

10. A method of manufacturing a vial for holding a micro-volume of fluid, comprising:
   injection molding a body defining an interior wall, wherein the body is a unitary structure, comprising a cylindrical sample section having a closed bottom, a wider cylindrical alignment section, a conical guide section, and a relatively large cylindrical body section having an opening, arranged in sequence in that order along a center axis of the body, wherein the wider cylindrical alignment section is immediate adjoining to the cylindrical sample section along the center axis of the body, wherein the cylindrical sample section is sized to receive a tip of a capillary tube and to hold a micro-volume of fluid in the order of less than 5 micro-liters, and wherein the exit end of the wider cylindrical alignment section immediate adjoins the opening end of the cylindrical sample section without any restraint at the opening end of the cylindrical sample section to allow insertion of the tip of the capillary tube.

11. The method as in claim 10, wherein the interior wall of the body transitions from the cylindrical sample section to the wider cylindrical alignment section, wherein interior diameter of the cylindrical sample section transitions to an immediate larger interior diameter of the cylindrical alignment section without a constriction in diameter.

12. The method as in claim 11, wherein the micro-volume is in the order of 1 to 2 micro liters.

13. The method as in claim 12, wherein the cylindrical sample section has an internal diameter of about 0.5 mm, receiving the tip of the capillary tube having an outside diameter of similar size.

14. The method as in claim 13, wherein the cylindrical alignment section has a larger diameter than the cylindrical sample section, sized to receive a cylindrical support for the capillary tube to extend to the cylindrical sample section.

15. A method of manufacturing a strip of vials each having a structure as in claim 1 for holding micro-volumes of fluid, comprising a plurality of N (N>0) vials in which adjacent vials are connected by a tab.

16. The method as in claim 15, wherein N is equal to 8 or 12.

17. A bioanalytical process, comprising access to a micro-volume of fluid, wherein said access comprises:
   providing a vial comprising a body defining an interior wall, wherein the body is a unitary structure, comprising a cylindrical sample section having a closed bottom, a wider cylindrical alignment section, a conical guide section, and a relatively large cylindrical body section having an opening, arranged in sequence in that order along a center axis of the body, wherein the wider cylindrical alignment section is immediate adjoining to the cylindrical sample section along the center axis of the body, wherein the cylindrical sample section is sized to receive a tip of a capillary tube and to hold a micro-volume of fluid in the order of less than 5 micro-liters, and wherein the exit end of the wider cylindrical alignment section immediate adjoins the opening end of the cylindrical sample section without any restraint at the opening end of the cylindrical sample section to allow insertion of the tip of the capillary tube;
   inserting a capillary tube coaxially supported in a wider cylindrical support tube, with the support tube and the capillary tube inserted into the cylindrical alignment section, and with a distal tip of the capillary tube extending into the cylindrical sample section, wherein the support tube does not extend into the cylindrical sample section.

18. The process as in claim 17, wherein the cylindrical alignment section has a larger diameter than the cylindrical sample section, sized to receive the cylindrical support tube with the tip of the capillary tube extending into the cylindrical sample section.

19. The process as in claim 18, wherein the conical guide section provides a tapered wall surface to guide the tip of the capillary tube and the cylindrical support tube into the cylindrical alignment section and the tip of the capillary tube into the cylindrical sample section.

* * * * *